United States Patent [19]

Moritz et al.

[11] Patent Number: 5,020,313
[45] Date of Patent: Jun. 4, 1991

[54] GUIDE OR FEEDER CHAIN FOR GUIDING POWER LINES

[75] Inventors: Werner Moritz, Siegen; Volker Jud, Wilnsdorf; Georg Wisser, Luckenbach, all of Fed. Rep. of Germany

[73] Assignee: Kabelschlepp Gesellschaft mit beschränkter Haftung, Siegen, Fed. Rep. of Germany

[21] Appl. No.: 562,636

[22] Filed: Aug. 3, 1990

[30] Foreign Application Priority Data

Aug. 26, 1989 [DE] Fed. Rep. of Germany ....... 3928236

[51] Int. Cl.⁵ ............................................. F16G 13/16
[52] U.S. Cl. ........................................ 59/78.1; 59/900; 248/49
[58] Field of Search ................ 59/78, 78.1, 900, 93; 248/48, 49, 50, 51, 78

[56] References Cited

U.S. PATENT DOCUMENTS

| | | |
|---|---|---|
| 3,779,003 | 12/1973 | Boissevain et al. ................ 59/78.1 |
| 4,104,871 | 8/1978 | Moritz ................................ 59/78.1 |
| 4,747,261 | 5/1988 | Frenker-Hackfort ............... 59/93 |
| 4,800,714 | 1/1989 | Moritz ................................ 59/900 |

FOREIGN PATENT DOCUMENTS

| | | |
|---|---|---|
| 2417516 | 11/1974 | Fed. Rep. of Germany . |
| 3431531 | 3/1986 | Fed. Rep. of Germany . |
| 3617447 | 10/1987 | Fed. Rep. of Germany . |
| 1142149 | 2/1969 | United Kingdom ................ 59/78.1 |

*Primary Examiner*—David Jones
*Attorney, Agent, or Firm*—Robert W. Becker & Associates

[57] ABSTRACT

A guide or feeder chain for power and supply lines is provided. The chain includes chain links formed from two spaced-apart side pieces or link members that are disposed parallel to one another and are interconnected via crosspieces. Successive chain links are pivotably interconnected where they overlap one another. So that the chain links can slide on one another without becoming worn or generating noise, sliding skids are detachably secured to narrow sides of the side pieces or link members.

8 Claims, 3 Drawing Sheets

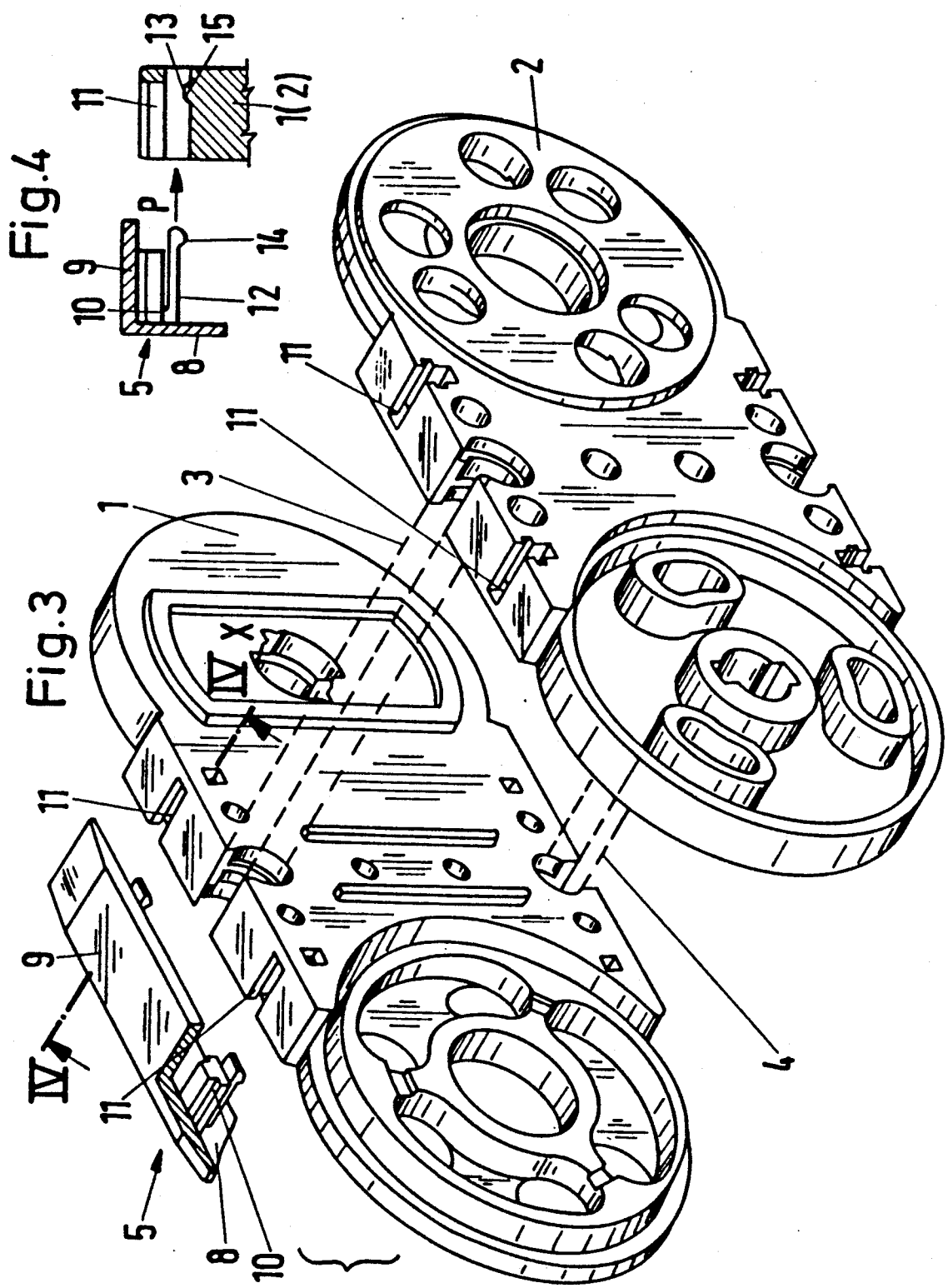

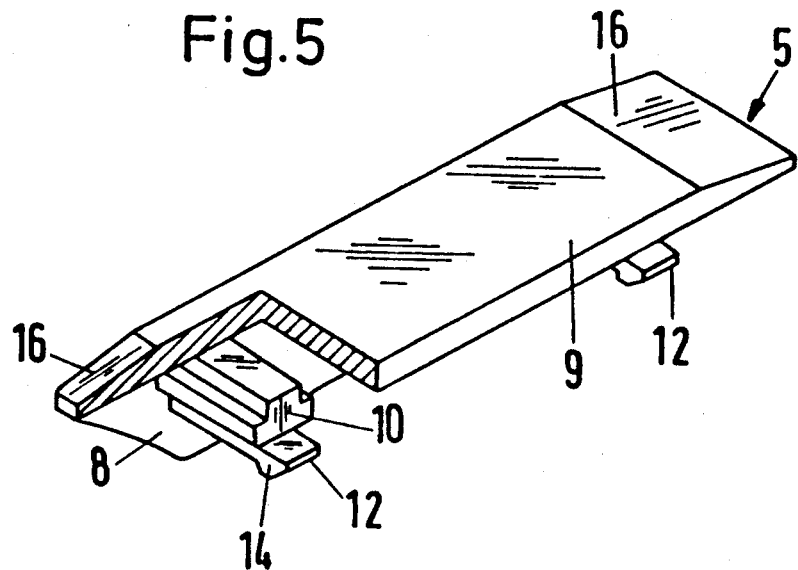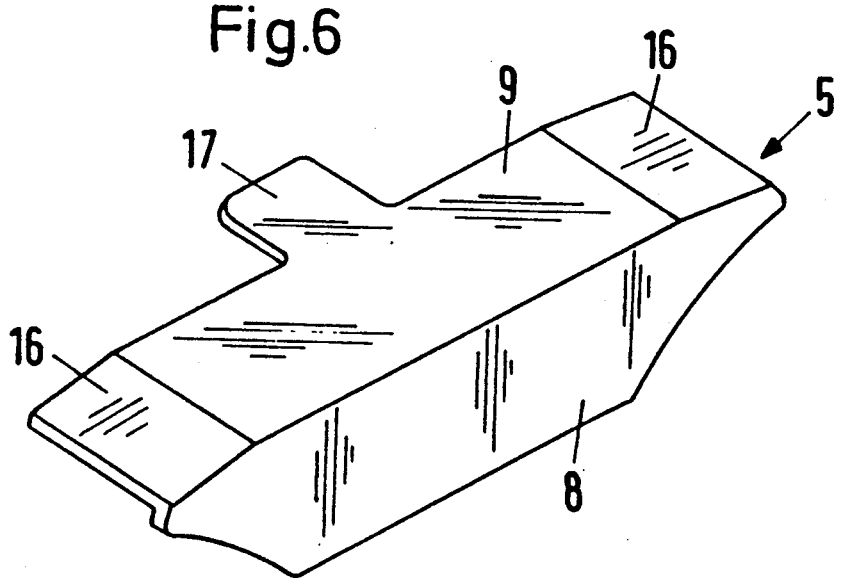

GUIDE OR FEEDER CHAIN FOR GUIDING POWER LINES

BACKGROUND OF THE INVENTION

The present invention relates to a guide or feeder chain for power and supply lines, and includes chain links formed from two spaced-apart side pieces or link members that are disposed parallel to one another and are interconnected via crosspieces, with successive chain links being pivotably interconnected where they overlap one another.

Guide or feeder chains are generally disposed between a fixed connection and a movable load or consuming device, for example the support of a shop machine, but also the carriage of a crane; these chains can have a long travel path. In this connection, it is possible that the upper run of a fixed guide or feeder chain is placed upon the lower run or a special slide plate, upon which it must slide. In so doing, considerable wear and also undesirable noise can result.

DE-OS 34 31 531 discloses a guide or feeder chain that comprises one-piece chain links, with sliding skids being formed on the lower chord of a cross member. Since these known sliding skids are inevitably produced together with the remainder of the chain link in an injection mold, they can therefore only be made of the same material as the remainder of the chain link. So that the chain links of a guide or feeder chain that is made of plastic have an adequate rigidity, a glass fiber reinforced plastic (GFP) is therefore generally used. This material has a great hardness and therefore has no sliding or damping characteristics. Consequently, GFP is the wrong material for sliding skids.

DE-AS 24 17 516 discloses a guide or feeder chain that is supported upon rollers. The high resistance that is associated therewith, as well as the jerky movement of the guide or feeder chain, represent a high stress on the material.

DE-PS 36 17 447 and U.S. Pat. No. 3,779,003 disclose guide or feeder chains where the link members of the chain are connected by crosspieces. These crosspieces are intended to fulfill holding, sealing, and sliding functions, so that for rigidity purposes here also a single material is utilized that does not have optimum sliding and damping characteristics.

It is therefore an object of the present invention to provide a guide or feeder chain where the chain links can slide on one another with as little wear and noise as possible.

BRIEF DESCRIPTION OF THE DRAWINGS

This object, and other objects and advantages of the present invention, will appear more clearly from the following specification in conjunction with the accompanying schematic drawings, in which:

FIG. 3 is an exploded view of one exemplary embodiment of an inventive chain link;

FIG. 4 is a cross-sectional view taken along the line IV—IV in FIG. 3 and shows a sliding skid and a portion of a link member;

FIG. 5 is an enlarged, partially cross-sectioned view of a sliding skid; and

FIG. 6 is an enlarged view of a sliding skid on which is formed a tab.

SUMMARY OF THE INVENTION

Figure 1:
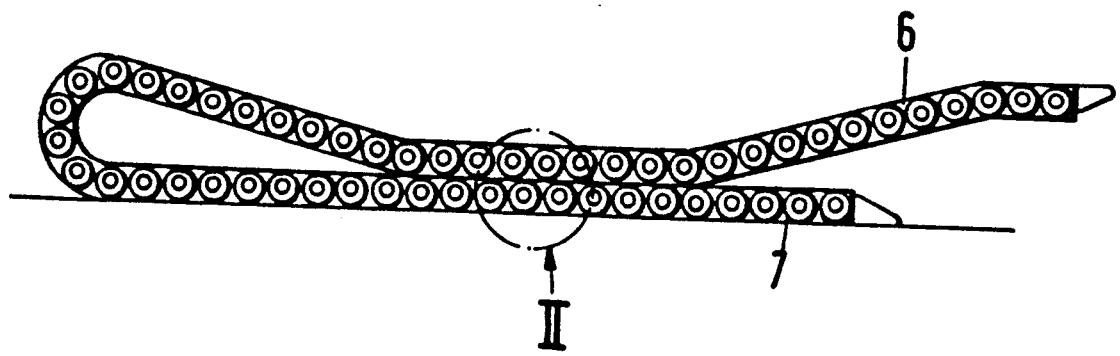
FIG. 1 is a side view of a long guide or feeder chain where the upper run is placed upon a lower run.
Figure 2:
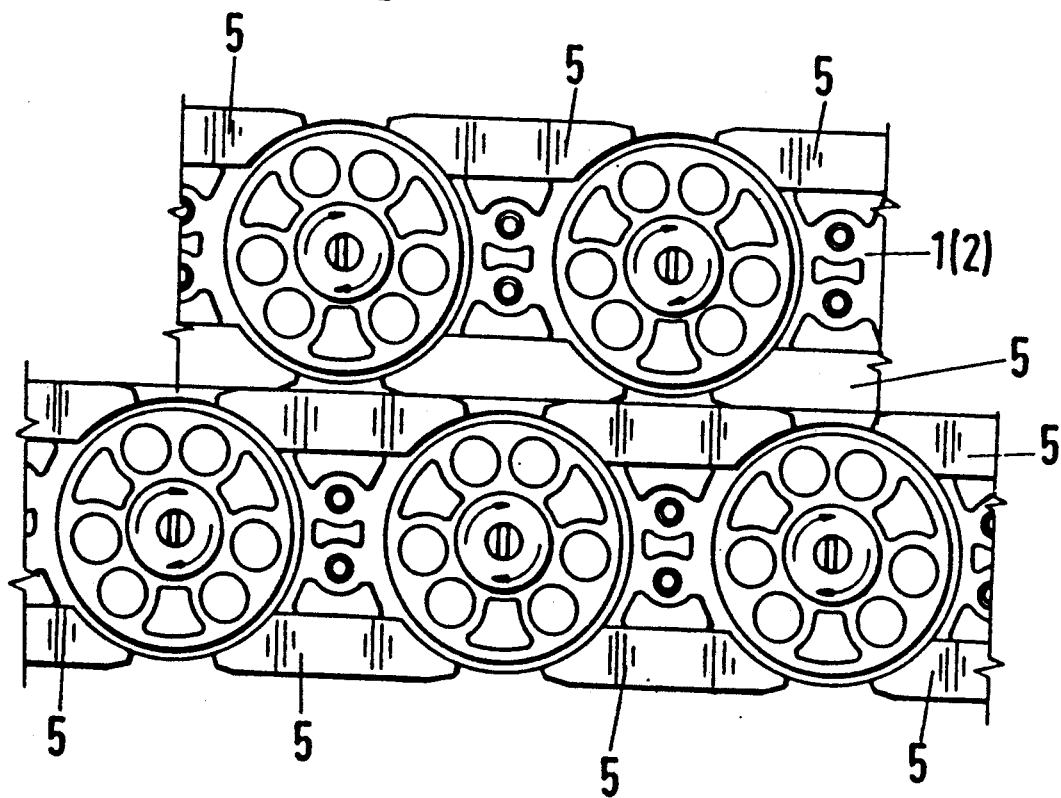
FIG. 2 is an enlarged side view of the dot-dash encircled portion of FIG. 1 to illustrate the positioning and support of the sliding skids relative to one another in the region where the runs of the chain rest against one another.

The sliding skids of the inventive guide or feeder chain are characterized primarily in that they are made of plastic that has a sliding property, is resistant to wear, and has good damping characteristics, with the sliding skids being detachably secured to the narrow sides of the link members or side pieces of the chain.

Pursuant to one practical specific embodiment of the present invention, the sliding skids, when viewed in the longitudinal direction of the chain, can have an L-shaped cross-sectional configuration, with one leg resting on the outer side of a link member, and the other leg engaging over the narrow side of a link member. T-shaped or dovetailed profiled insertion elements can be formed in the angle between the two legs of the sliding skids, with these profiled insertion elements being adapted to be inserted into corresponding profiled guides of the link members that are provided with appropriate undercuts.

Pursuant to a further specific embodiment of the present invention, it is proposed that in addition to the profiled insertion elements, resilient catching tongues be provided on the sliding skids, whereby in the inserted state, these latching tongues extend over latching cams on the link member, thereby fixing the sliding skids on the link members in the inserted positions.

A guide or feeder chain that has the inventive sliding skids detachably secured to the link members has the advantage that the sliding skids and the link members can be made of different materials. In particular, the link members can be made of a GFP that ensures the required rigidity, and the sliding skids can be made of polyurethane. A further advantage is that the chain links can be optionally operated with or without sliding skids, depending upon the intended application for the guide or feeder chain.

Further specific features of the present invention will described in detail subsequently.

DESCRIPTION OF PREFERRED EMBODIMENTS

Referring now to the drawings in detail, the chain links of a plastic guide or feeder chain are formed by two spaced-apart link members or side pieces 1 and 2 that are disposed parallel to one another and are interconnected by crosspieces 3 and 4 to form a hollow space in which non-illustrated power and supply lines can be placed in a protected and tension-free manner. Detachably mounted on the upper and lower narrow sides of the link members 1, 2 are sliding skids 5 that slide upon one another when the upper run 6 of a guide chain is supported upon a portion of the lower run 7 thereof. The length of the sliding skids 5 is such that the spaces between the sliding skids of pivotably interconnected, adjacent link members or side pieces 1 or 2 are bridged.

As can be seen in particular from FIG. 4, each sliding skid 5, when viewed in the longitudinal direction of the chain, has an L-shaped cross-sectional configuration, with one leg 8 resting upon the outer side of its link member 1 or 2, while the other leg 9 extends over the narrow side of the side piece or link member. Formed on the inner and under side of the legs 8, 9 are spaced-apart T-shaped profiled insertion elements 10 that extend into corresponding profiled guides 11 in the link members 1, 2 that are provided with appropriate undercuts.

Formed on each profiled insertion element 10 is a resilient latching tongue 12 that can be inserted into a through opening 13 of the link members 1, 2. A lip 14 on the latching tongue 12 can engage over a latching cam 15 in the opening 13.

To facilitate the ability of the sliding skids 5 to slide on one another, the ends of the legs 9 of each sliding skid are provided with inclined surfaces 16.

In the embodiment illustrated in FIG. 6, the leg 9 of the sliding skid 5 is provided with a tab 17 that extends inwardly beyond the narrow side of the link member 1, 2 and serves to securely hold in place a cover band that can be inserted between the crosspieces 3, 4 and the tabs 17. However, these tabs 17 can also serve to hold securely in place cover plates that have been mounted on the crosspieces 3, 4.

The sliding skids 5 can be optionally secured to the side pieces or link members 1, 2. This is effected by a simple insertion in the direction of the arrow P as illustrated in FIG. 4. If necessary, the sliding skids 5 can also be very easily removed from the link members 1, 2. To accomplish this, it is merely necessary to slightly raise the free ends of the latching tongues 12 that project out of the opening of the profiled guide 11 and to then remove the sliding skids 5 in a direction transverse to the link members 1, 2.

The present invention is, of course, in no way restricted to the specific disclosure of the specification and drawings, but also encompasses any modifications within the scope of the appended claims.

What we claim is:

1. In a guide or feeder chain for power and supply lines, including chain links formed from two spaced-apart parallel link members having narrow sides and being interconnected via crosspieces, with successive chain links being interconnected via crosspieces, with successive chain links being pivotably interconnected where their link members overlap one another, the improvement comprising:
   on said narrow sides of said link members sliding skids that are detachably secured to said narrow sides of respective said link members and are made of plastic that has a sliding property, is resistant to wear, and has good damping characteristics, with said sliding skids overlapping said narrow sides of said link members and having a width corresponding to said narrow sides of said link members.

2. A guide or feeder chain according to claim 1, in which said sliding skids are made of polyurethane.

3. A guide or feeder chain according to claim 1, in which side sliding skids are provided with T-shaped or dovetailed profiled insertion elements that are mounted in corresponding profiled guides of said link members that are provided with appropriate undercuts.

4. A guide or feeder chain according to claim 3, in which said sliding skids are provided with resilient latching tongues that, when said skids are mounted on said link members, engage over latching cams of said link members.

5. A guide or feeder chain according to claim 4, in which said sliding skids, when viewed in a longitudinal direction of said chain, have an L-shaped cross-sectional configuration comprising two legs, with said profiled insertion elements and said latching tongues being formed on said legs.

6. A guide or feeder chain according to claim 5, in which one of said legs of said sliding skid extends over said narrow side of said link member and is provided with a tab for holding in place a cover band or cover plates.

7. A guide or feeder chain according to claim 5, in which each of said sliding skids has a length that is greater than a space between sliding skids of adjacent, pivotably interconnected link members.

8. A guide or feeder chain according to claim 5, in which one of said legs of said sliding skid extends over said narrow side of said link member and is provided with inclined surfaces.

* * * * *